(12) United States Patent  
Sasaki

(10) Patent No.: US 6,614,481 B1  
(45) Date of Patent: Sep. 2, 2003

(54) HOOD DEVICE FOR AN IMAGE PICKUP APPARATUS

(75) Inventor: Masahiko Sasaki, Chiba (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/190,220

(22) Filed: Nov. 13, 1998

(30) Foreign Application Priority Data

Nov. 14, 1997 (JP) .............................................. 9-331217

(51) Int. Cl.⁷ .............................................. H04N 5/225
(52) U.S. Cl. ...................... 348/373; 348/375; 396/534; 396/535
(58) Field of Search ................................ 348/372, 373, 348/374, 375, 341, 333.01; 396/534, 535

(56) References Cited

U.S. PATENT DOCUMENTS

| | | | | |
|---|---|---|---|---|
| 3,971,065 A | * | 7/1976 | Bayer ........................... | 313/371 |
| 4,451,130 A | * | 5/1984 | Yan .............................. | 396/336 |
| 5,184,173 A | * | 2/1993 | Kirigaya ....................... | 396/281 |
| 5,491,507 A | * | 2/1996 | Umezawa et al. ........ | 348/14.02 |
| 5,650,818 A | * | 7/1997 | Takano ..................... | 348/222.1 |
| 5,734,428 A | * | 3/1998 | Suda et al. ............. | 348/333.02 |
| 5,740,480 A | * | 4/1998 | Kuhn et al. .................... | 348/64 |
| 5,822,638 A | * | 10/1998 | Yoshida et al. ............. | 396/177 |
| 5,987,263 A | * | 11/1999 | Toyoda et al. ............... | 396/178 |
| 6,067,116 A | * | 5/2000 | Yamano et al. ............. | 348/372 |
| 6,308,084 B1 | * | 10/2001 | Lonka ...................... | 348/14.01 |

FOREIGN PATENT DOCUMENTS

JP  411234544 A1 * 8/1999 .......... H04N/5/225

* cited by examiner

*Primary Examiner*—Andrew Christensen  
*Assistant Examiner*—Eric Wisdahl  
(74) *Attorney, Agent, or Firm*—Greenblum & Bernstein, P.L.C.

(57) ABSTRACT

A hood device 10 is provided for a two-dimensionally-scanning camera 20. The scanning camera 20 includes a body housing 22 and an image pickup optical system 28 housed in the body housing 22 for capturing an image in the field of view. The scanning camera 20 has a finder screen 36 provided on the top surface of the body housing 22. The body housing 22 further has a photographing window 30 formed therein, through which environmental light may enter the image pickup optical system 28 so as to form an image to be captured by the scanning camera 20. The hood device 10 comprises a hood mechanism 42 coupled to the body housing 22 and movable between first and second positions. The hood mechanism 42, when in the first position, covers the finder screen 36 and close the photographing window 30. The hood mechanism 42, when in the second position, uncovers the finder screen 36, leaves the photographing window 30 open and partially surrounds the finder screen 36 for shading it from environmental light.

18 Claims, 3 Drawing Sheets

HOOD DEVICE FOR AN IMAGE PICKUP APPARATUS

The present disclosure relates to subject matter contained in Japanese Patent Application No. Hei-9-331217 filed on Nov. 14, 1997, which is expressly incorporated herein by reference in its entirety.

BACKGROUND OF THE INVENTION

1. Field of the invention

The present invention relates to a hood device for an image pickup device. The term "image pickup device" used herein means any of various cameras including photographic cameras, electronic still cameras and video cameras, as well as any of image scanners and the like.

2. Description of the Related Art

Most of image pickup apparatus, such as cameras and image scanners, have a certain kind of monitor device for monitoring an image in the field of view to be picked up by the apparatus. Such commonly used monitor devices may be categorized into three major groups.

Those of the first group are characterized in that the user directly views objects in the field of view through the monitor device. The monitor devices of this type include a direct vision finder found in many compact cameras.

Those of the second group are characterized in that the monitor device comprises an image display screen housed in a body housing of the image pickup apparatus (such image display screen may be either an optical focusing screen (i.e., a finder screen) or a liquid crystal display (LCD) panel) and in that the user peeps in the body housing through an eye-piece to view the image display screen. This type of monitor devices include view finders for the single lens reflex cameras and LCD view finders for some of the professional-use video cameras.

Those of the third group are characterized by an image display screen provided on an outer surface of a body housing of the image pickup apparatus. The image display screen again may be either an optical focusing screen or an LCD panel. This type of monitor devices will not confine the sight of the user to the field of view of the image pickup device, so that the user can conveniently make an active image capturing, such as shooting while walking or running. Further, since the image displayed on the image display screen may be viewed by both eyes, impressions of the image produced on those who would subsequently view the image may be easily and relatively accurately estimated at the time of photographing.

The monitor devices of the third type are found in many recent, home-use video cameras and electronic still cameras, since it is very easy for an amateur cameraman to use a camera having such a monitor device. The monitor devices of this type, however, suffer from a drawback that the image display screen may reflect environmental light, tending to dilute and make it difficult to see the image on the image display screen. In order to overcome this problem, a hood for surrounding and shading the image display screen from environmental light may be often used.

In addition, the monitor devices of the third type have another drawback that the image display screen provided on the outer surface of the body housing of the image pickup apparatus is likely to be injured by contacts with certain hard objects. In order to protect the image display screen from such injurious contacts, it is generally recommended to cover the image display screen with a protection cover.

Recent video cameras and electronic still cameras use a charge-coupled-device (CCD) image sensor. Some of such cameras have no mechanical shutter, such as lens shutter, so that the CCD image sensor used is not protected by the mechanical shutter from the direct sunshine, which may possibly pass through the photographing lens to hit and injure the CCD image sensor. Thus, in order to protect the CCD image sensor from the injurious direct sunshine, as well as to protect the photographing lens or a cover glass thereof from injurious contacts with certain hard objects, it is generally recommended to keep the photographing lens covered by a lens cap all the time but when the camera is used to take a picture. However, it is cumbersome to put the lens cap on the photographing lens each time a picture has been taken. In fact, people often forget to do it.

It is also cumbersome for the user of such a camera to bring along a protection cover for the image display screen, a hood for the image display screen and a lens cap for the photographing lens. People are very likely to misplace and lose such accessories,

SUMMARY OF THE INVENTION

In view of the foregoing, it is an object of the present invention to provide a hood device for an image pickup apparatus, the image pickup apparatus including i) a body housing ii) an image pickup optical system housed in the body housing for capturing an image in a field of view, iii) an image display screen provided on an outer surface of the body housing and iv) the body housing having an image pickup light-passage formed therein through which environmental light may enter the image pickup optical system, wherein the hood device may provide multiple functions including those of a protection cover for the image display screen, of a hood for shading the image display screen from environmental light and of a cap for closing the image pickup light-passage. Further, such hood device should be helpful in preventing an inadvertent failure of putting an protection cap in place, as well as in eliminating the need for bringing along separate accessories including a protection cover for the image display screen, a hood for the image display screen and a protection cap for the photographing optical system.

In accordance with the present invention, there is provided a hood device for an image pickup apparatus, said image pickup apparatus including i) a body housing ii) an image pickup optical system housed in the body housing for capturing an image in a field of view, iii) an image display screen provided on an outer surface of the body housing and iv) the body housing having an image pickup light-passage formed therein through which environmental light may enter the image pickup optical system. The hood device comprises a hood mechanism coupled to the body housing and movable between first and second positions. The hood mechanism is so arranged as to, when in the first position, cover the image display screen and close the image pickup light-passage. Further, the hood mechanism is so arranged as to, when in the second position, uncover the image display screen, leave the image pickup light-passage open and at least partially surround the image display screen for shading the image display screen from environmental light.

The image pickup apparatus may have an optical finder for monitoring an image in a field of view, and the optical finder may include a finder screen. In such case, the image display screen may comprise the finder screen. Alternatively, the image pickup apparatus may have a monitor device including a liquid crystal display panel. In such case, the image display screen may comprise the liquid crystal display panel.

The image pickup apparatus may comprise a video camera having a charge-coupled-device image sensor. Alternatively, the image pickup apparatus may comprise an electronic still camera having a two-dimensional-array charge-coupled-device image sensor. Alternatively, the image pickup apparatus may comprise a two-dimensionally-scanning camera including a linear charge-coupled-device image sensor and a scanning optical system.

In one embodiment of the present invention, the hood mechanism comprises a hood member connected to the body housing for pivoting motion, and the hood member comprises a first plate portion and a second plate portion. The first and second plate portions are so arranged as to cover the image display screen and close the image pickup light-passage, respectively, when the hood mechanism is in the first position.

In this embodiment, the body housing has a front wall defining a front surface and a top wall defining a top surface. The image pickup light-passage is formed in the front wall of the body housing. The image display screen is provided on the top surface of the body housing. The first and second plate portions of the hood member is so arranged as to lie in the top and front surfaces, respectively, of the body housing when the hood mechanism is in the first position. Further, the first and second plate portions of the hood member are so arranged as to lie at one side and in front, respectively, of the image display screen and extend upright relative to the top surface of the body housing for shading the image display screen from environmental light when the hood mechanism is in the second position.

In another embodiment of the present invention, the hood mechanism comprises a first hood member connected to the body housing for pivoting motion and a second hood member supported by the body housing for sliding motion. The first and second hood members are so arranged as to cover the image display screen and close the image pickup light-passage, respectively, when the hood mechanism is in the first position. The hood mechanism further comprises a linkage for interlocking pivoting motion of the first hood member and sliding motion of the second hood member with each other.

In this embodiment, the body housing has a front wall defining a front surface and a top wall defining a top surface. The image pickup light-passage is formed in the front wall of the body housing. The image display screen is provided on the top surface of the body housing. The first and second hood members are so arranged as to lie in the top and front surfaces, respectively, of the body housing when the hood mechanism is in the first position. Further, first and second hood member are so arranged as to lie at one side and in front, respectively, of the image display screen and extend upright relative to the top surface of the body housing for shading the image display screen from environmental light when the hood mechanism is in the second position.

The image pickup apparatus may have an electrical switch relating to a function of the image pickup apparatus, and the hood mechanism may be capable of turning on and off the electrical switch depending on the position of the hood mechanism.

The image pickup light-passage may comprise a window formed in a wall of the body housing with a cover glass fitted in the window, and the hood mechanism may be capable of protecting the cover glass when it is in the first position.

The hood mechanism may be capable of blocking and preventing environmental light from entering the image pickup optical system when it is in the first position.

BRIEF DESCRIPTION OF THE DRAWINGS

The above and other objects, features and advantages of the present invention will be apparent from the following detailed description of preferred embodiments thereof, reference being made to the accompanying drawings, in which.

DETAILED DESCRIPTION OF PREFERRED EMBODIMENTS

Referring now to the accompanying drawings, preferred embodiments of the present invention will be described in detail.

Figure 1:
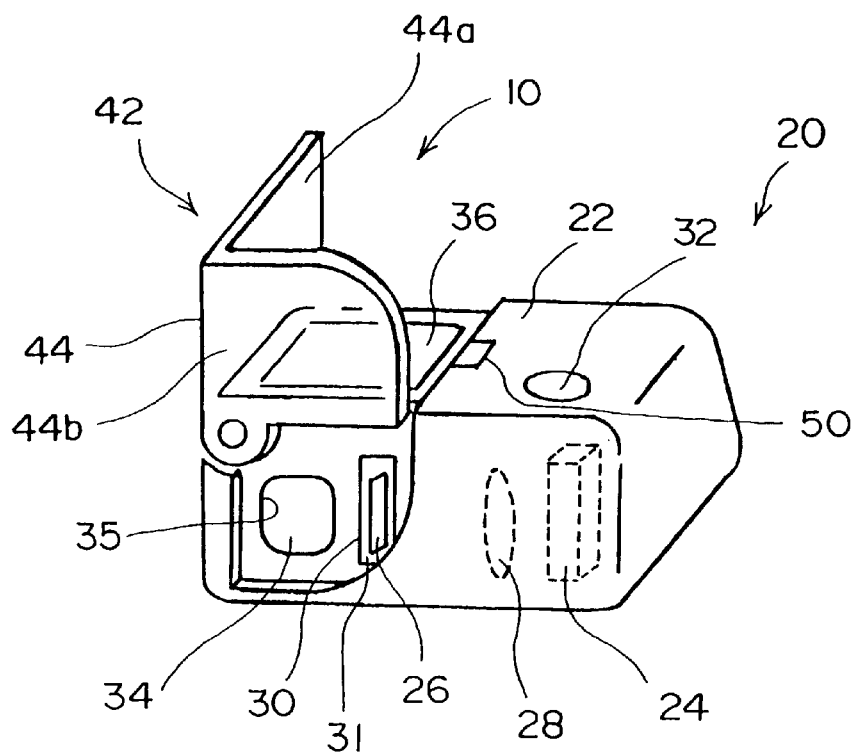
FIG. 1 is a perspective view of a scanning-type electronic still camera provided with a hood device according to a first embodiment of the present invention.
Figure 2:
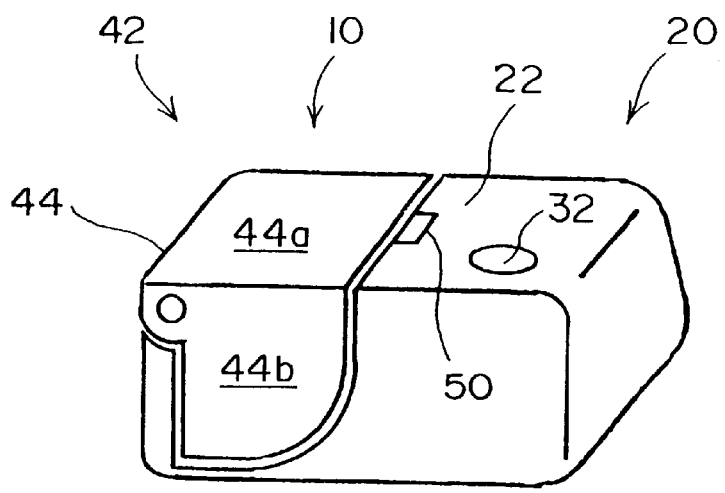
FIG. 2 is a perspective view, similar to FIG. 1, showing a hood mechanism of the hood device of FIG. 1 in a different position.
Figure 3:
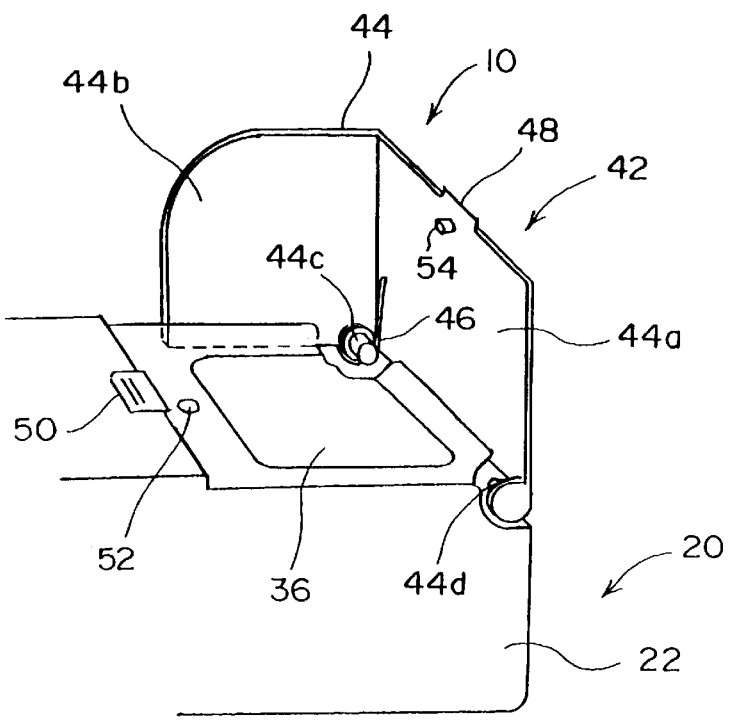
FIG. 3 is a perspective view of a critical portion of the scanning-type electronic still camera of FIG. 1.

FIG. 1 is a perspective view of a scanning-type electronic still camera provided with a hood device according to a first embodiment of the present invention; FIG. 2 is a perspective view, similar to FIG. 1, showing a hood mechanism of the hood device of FIG. 1 in a different position; and FIG. 3 is a perspective view of a critical portion of the scanning-type electronic still camera of FIG. 1.

With reference first to FIG. 1, there is shown a hood device 10 for an image pickup apparatus, which is constructed and arranged in accordance with a first embodiment of the present invention. The image pickup apparatus shown is an electronic still camera 20 of a so-called two-dimensionally-scanning-type (referred to more simply as the "scanning camera" hereinafter). The scanning camera 20 comprises a body housing 22 of a generally parallelepiped shape, within which housed are various components requisite for an electronic still camera of the two-dimensionally-scanning-type.

These components include a linear charge-coupled-device (CCD) image sensor 24, a pivoting mirror 26 for scanning an image in a field of view and directing light from the field of view toward the linear CCD image sensor 24, a mirror drive mechanism (not shown), an image pickup optical system (schematically shown) 28 and an electronic circuitry (not shown) including a read-out circuit, a memory, various control circuits and a battery serving as a power source for the mirror drive mechanism and the circuits.

The linear CCD image sensor 24 is so disposed in the body housing 22 as to extend in the vertical direction, so that it provides vertical scanning of an image in the field of view. The pivoting mirror 26 is supported by the body housing 22 for pivoting motion about a vertical axis, while the mirror drive mechanism drives the pivoting mirror 26 to rotate it about the vertical axis through a selected angle. Thus, the pivoting mirror 26, the mirror drive mechanism and the image pickup optical system 28 together form an scanning optical system, providing horizontal scanning of an image in the field of view. In this manner, the above arrangement provides two-dimensional scanning.

The image pickup optical system 28 includes a focusing lens for focusing on the linear CCD image sensor 24 the light rays reflected off the pivoting mirror 26. The read-out circuit reads out the output signals from the liner CCD image sensor 24 and stores them in the memory.

The basic arrangement and construction of this two-dimensionally-scanning-type electronic still camera are well known in the art, so that further details of this scanning camera are omitted herein for simplicity.

The body housing 22, which is of a generally parallelepiped shape as described above, has a front wall defining a front surface, a top wall defining a top surface, a rear wall, a bottom wall and opposed side walls. The body housing 22 has a photographing window 30, which is formed in the front wall to define an "image pickup light-passage" through which environmental light may enter the image pickup optical system 28 so as to form an image to be captured by the scanning camera 20. The pivoting mirror 26 is disposed at a position near the photographing window 30, such that light entering the body housing 22 through the window 30 may be reflected by the pivoting mirror 26 into the image pickup optical system 28. A cover glass 31 is fitted in the window 30 to provide protection of the pivoting mirror 26 and the image pickup optical system 28. A shutter button 32, which is pressed down by the user to take a picture, is provided on the top surface of the body housing 22.

The scanning camera 20 further comprises an optical finder as a monitor device for monitoring an image in the field of view. The optical finder comprises an objective lens 34 fitted in a finder window 35 formed in the front wall of the body housing 22, a reflex mirror (not shown) housed in the body housing 22, and a finder screen (i.e., a focusing screen) 36 provided on the top surface of the body housing 22 and fitted in an opening formed in the top wall of the body housing 22. The finder screen 36 is so disposed as to extend substantially in the plane of the top surface of the body housing 22. An image in the field of view, which is to be photographed by the scanning camera 20, is projected through the objective lens 34 and the reflex mirror onto the finder screen 36, so that the image is viewable by the user. The finder screen 36 is thus an image display screen provided on an outer surface of the body housing 22.

The hood device 10 comprises a hood mechanism 42 coupled to the body housing 22 and movable between a first position (as shown in FIG. 2) and a second position (as shown in FIG. 1). In this embodiment, the hood mechanism 42 comprises a hood member 44 connected to the body housing 22 for pivoting motion. The hood member 44 comprises a first plate portion 44a capable of covering the finder screen 36 and a second plate portion 44b capable of covering the window 30 in the front wall of the body housing 22 so as to block and prevent environmental light from entering the image pickup optical system 28.

More specifically, the first plate portion 44a is a flat plate portion of a generally rectangular shape. The second plate portion 44b is also a flat plate portion of a generally rectangular shape, which has one side edge thereof integrally connected to one side edge of the first plate portion 44a such that the first and second plate portions 44a and 44b meet to form an angle which is substantially equal to a right angle.

The hood member 44 is preferably made of an opaque, nontransparent plastic material. It may be preferably made of a black or dark-colored plastic material with the inner side surfaces (i.e., hidden surfaces under the condition as shown in FIG. 2) of the hood member 44 being finished to be a dull, unbrightened surface. Alternatively, the inner side surfaces may be preferably painted with a black or dark-colored flat paint.

The hood member 44 has a pair of pivot pins 44c and 44d (FIG. 3). The first of the pivot pins, 44c, is formed on the second plate portion 44b at one corner thereof while the second of the pivot pins, 44d, is formed on the first plate portion 44b so as to face the first pivot pin 44c. The pivot pins 44c and 44d are received in corresponding holes formed in the body housing 22, which are formed in the front and rear walls of the body housing 22 at their upper, right-hand corners, respectively. In this manner, the hood member 44 is hinged to the body housing 22 for pivoting motion about the horizontal axis that is defined by the holes formed in the body housing 22. As shown, that corner of the second plate portion 44b which is opposite to that having the first pivot pin 44c is rounded to allow the pivoting motion of the hood member 44.

The hood device 10 further comprises an urging mechanism for normally urging the hood mechanism 42 from the first position to the second position and a lock mechanism for locking the hood mechanism 42 to the first position.

More specifically, the urging mechanism comprises a helical torsion spring 46 having a pair of arms (only one of them is shown in FIG. 3) and fitted over the pivot pin 44c of the hood member 44. The spring 46 has one arm (not shown) engaging with the body housing 22 and the other arm with the hood member 44, such that the spring 46 tends to rotate the hood member 44 relative to the body housing 22.

The lock mechanism comprises a catch 48, which is an integral portion of the hood member 42 and is formed on the distal end edge of the first plate portion 44a of the hood member 42, and a slide lock member 50, which is supported by the body housing 22 for sliding motion and is engageable at its tip end with the catch 48.

The slide lock member 50, when in engagement with the catch 48, serves to retain the hood mechanism 42 in the first position as shown in FIG. 2. If the user operates the slide lock member 50 to disengage it from the catch 48, the helical torsion spring 46 kicks the hood member 44 upwardly to rotate it into the second position as shown in FIG. 1.

When the scanning camera 20 is not used, the hood mechanism 42 can be kept folded in the first position (FIG. 2). With the hood mechanism 42 in this position, the first plate portion 44a of the hood member 44 lies in the top surface of the body housing 22 to cover and protect the finder screen 36. At the same time, the second plate portion 44b of the hood member 44 lies in the front surface of the body housing 22 to close the photographing window 30 (and thus close the image pickup light-passage defined thereby), so that the second plate portion 44b blocks and prevents environmental light from entering the image pickup optical system 28 as well as protects the cover glass 31 fitted in the photographing window 30.

When the scanning camera 20 is used for taking a photograph, the user may simply operate the slide lock member 50 so as to unlock the hood mechanism 42, which is then moved by the helical torsion spring 46 into the second position as shown in FIG. 1. With the hood mechanism 42 in this position, the second plate portion 44b of the hood member 44 lies in front of the finder screen 36 and extends upright relative to the top surface of the body housing 22. At the same time, the first plate portion 44a lies at one side (right-hand side) of the finder screen 36 and extends again upright relative to the top surface of the body housing 22. Further, under this condition, each of the lower edges of the first and second plate portions 44a and 44b lies below the top surface of the body housing 22 (i.e., the first and second plate portions 44a and 44b overlap the front and right-hand side surfaces of the body housing 22, respectively), so that there is no such slit between them that allows light rays to pass therethrough to illuminate the finder screen 36. Thus, the hood mechanism 42, when in the second position, i) uncovers the finder screen 36, ii) leaves the photographing window 30 (and thus the image pickup light-passage) open and iii) partially surrounds the finder screen 36 so as to shades the finder screen 36 from environmental light which otherwise could illuminate the screen 36 from the front and the right-hand side of the scanning camera 20. This effectively reduces the dilution of the image on the screen 36 by such environmental light while permits environmental light to enter the image pickup optical system 28 for photographing.

An electric switch 52 (FIG. 3) is provided on the body housing 22. The electric switch 52 is connected in series with the main power switch (not shown) of the scanning camera 20. On the other hand, the first plate portion 44a of the hood member 44 has a protrusion 54 (FIG. 3) which is engageable with the electric switch 52 only when the hood mechanism 42 is in the first position. The electric switch 52 is a normally-closed switch and the state of the switch 52 (open or closed) is dependent on whether the hood mechanism 52 is in the first position. Thus, when the hood mechanism 42 is folded down into the first position, the power of the scanning camera 20 is turned off even if the main switch is left at its on-position.

Figure 4:
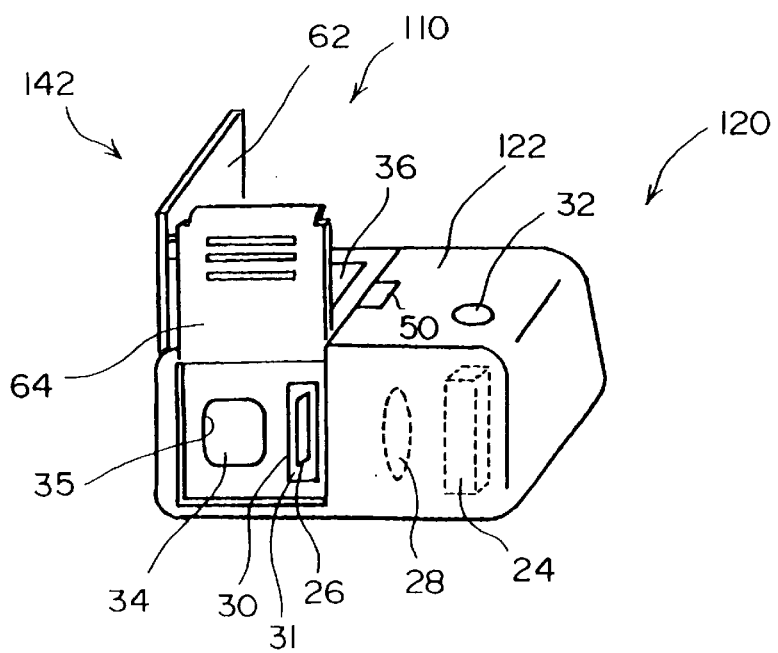
FIG. 4 is a perspective view of a scanning-type electronic still camera provided with a hood device according to a second embodiment of the present invention.
Figure 5:
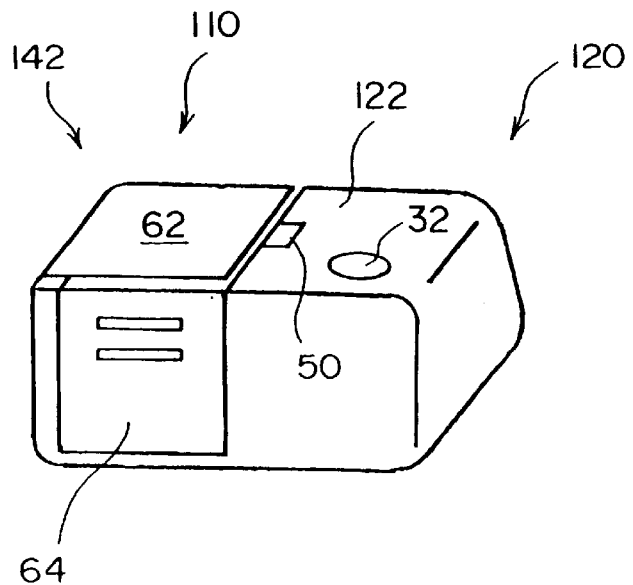
FIG. 5 is a perspective view, similar to FIG. 4, showing a hood mechanism of the hood device of FIG. 4 in a different position.
Figure 6:
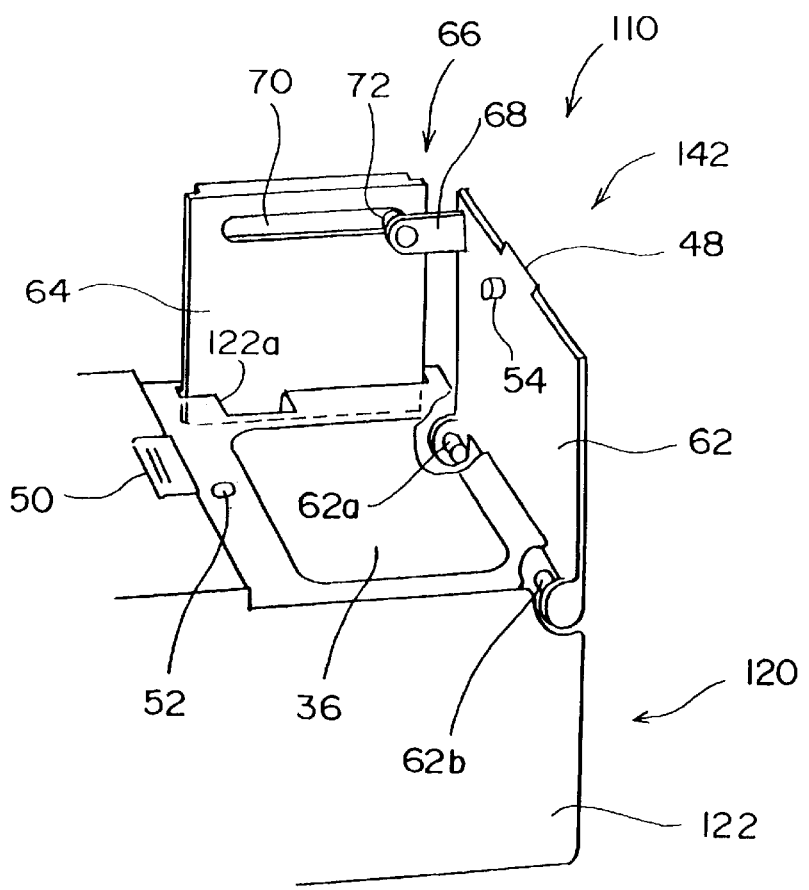
FIG. 6 is a perspective view of a critical portion of the scanning-type electronic still camera of FIG. 4.

Referring next to FIGS. 4 to 6, an alternative embodiment of the present invention will be described. FIG. 4 is a perspective view of a scanning-type electronic still camera provided with a hood device according to a second embodiment of the present invention; FIG. 5 is a perspective view, similar to FIG. 4, showing a hood mechanism of the hood device of FIG. 4 in a different position; and FIG. 6 is a perspective view of a critical portion of the scanning-type electronic still camera of FIG. 4.

With reference to FIG. 4, there is shown a hood device 110 for an image pickup apparatus, which is constructed and arranged in accordance with a second embodiment of the present invention. The image pickup apparatus shown is an electronic still camera 120 of a so-called two-dimensionally-scanning-type (referred to more simply as the "scanning camera" hereinafter).

The hood device 110 and the scanning camera 120 shown in FIGS. 4 to 6 are identical to the hood device 10 and the scanning camera 20 shown in FIGS. 1 to 3 except for some details in the arrangements and structures of their hood mechanisms 42 and 142 as well as for the appearances of the front faces of their body housings 22 and 122. In the following description, only the differences between these embodiments are described in detail, while the similarities are described briefly or even omitted for simplicity, with like elements being designated by like reference numerals.

The body housing 122 of the scanning camera 120 is of a generally parallelepiped shape and has a front wall defining a front surface, a top wall defining a top surface, a rear wall, a bottom wall and opposed side walls. The body housing 122 has a photographing window 30, which is formed in the front wall to define an "image pickup light-passage" through which environmental light may enter an image pickup optical system 28 so as to form an image to be captured by the scanning camera 120. A cover glass 31 is fitted in the window 30. The image pickup optical system 28 is the same as that described in connection with FIGS. 1 to 3.

The scanning camera 120 further comprises a linear charge-coupled-device (CCD) image sensor 24, a pivoting mirror 26, a mirror drive mechanism (not shown), a shutter button 32 and an electronic circuitry (not shown) including a read-out circuit, a memory, various control circuits and a battery serving as a power source for the mirror drive mechanism and the circuits, all of which are the same as those described in connection with FIGS. 1 to 3.

The scanning camera 120 further comprises an optical finder for monitoring an image in the field of view. The optical finder is similar to that provided for the scanning camera 20 of FIGS. 1 to 3, and comprises an objective lens 34 fitted in a finder window 35 formed in the front wall of the body housing 122, a reflex mirror (not shown) housed in the body housing 122, and a finder screen (i.e., a focusing screen) 36 provided on the top surface of the body housing 122 and fitted in an opening formed in the top wall of the body housing 122. The finder screen 36 is so disposed as to extend substantially in the plane of the top surface of the body housing 122. The finder screen 36 is thus an image display screen provided on an outer surface of the body housing 122.

The hood device 110 comprises a hood mechanism 142 coupled to the body housing 122 and movable between a first position (as shown in FIG. 5) and a second position (as shown in FIG. 4). In this embodiment, the hood mechanism 142 comprises a first hood member 62 connected to the body housing 122 for pivoting motion and a second hood member 66 supported by the body housing 122 for vertical sliding motion. The hood mechanism 142 further comprises a linkage 66 (FIG. 6) for interlocking the pivoting motion of the first hood member 62 and the sliding motion of the second hood member 64 with each other. By virtue of the provision of the linkage 66, when the user rotates the first hood member 62, the second hood member 64 is caused to slide in the vertical direction.

More specifically, the first hood member 62 is capable of covering the finder screen 36 and the second hood member 64 is capable of covering the window 30 in the front wall of the body housing 122 so as to block and prevent environmental light from entering the image pickup optical system 28. The first hood member 62 is a flat plate member of a generally rectangular shape. The second hood member 64 is also a flat plate member of a generally rectangular shape, which has opposed, right and left side edges received in corresponding vertical guide grooves formed in the body housing 122. In this manner, the second hood member 64 is supported and guided for vertical sliding motion.

The first and second hood members 62 and 64 are preferably made of an opaque, nontransparent plastic material. They may be preferably made of a black or dark-colored plastic material with their inner side surfaces (i.e., hidden surfaces under the condition as shown in FIG. 5) being finished to be a dull, unbrightened surface. Alternatively, the inner side surfaces may be preferably painted with a black or dark-colored flat paint.

The first hood member 62 has a pair of pivot pins 62a and 62b (FIG. 6) formed as integral portions of the first hood member 62. The pivot pins 62a and 62b are received in corresponding holes formed in the body housing 122, which are formed in the front and rear walls of the body housing 122 at their upper, right-hand corners, respectively. In this manner, the first hood member 62 is hinged to the body housing 122 for pivoting motion about the horizontal axis that is defined by the holes formed in the body housing 122.

The linkage 66 comprises an arm 68 formed as an integral portion of the first hood member 62, a horizontal groove 70 formed in the back surface of the second hood member 64 and a roller 72 attached at the distal end of the arm 68 and in engagement with the groove 70. The engagement of the roller 72 with the groove 70 provides interlocking of the motions of the first and second hood members 62 and 64. As shown in FIG. 6 the body housing 122 has a recess 122a formed therein, which is capable of receiving the arm 68 and the roller 72 therein when the hood mechanism 142 is in the first position (as shown in FIG. 5). The recess 122a is formed not to interfere with the photographing window 30.

The hood device 110 further comprises an urging mechanism for normally urging the hood mechanism 142 from the first position to the second position and a lock mechanism for locking the hood mechanism 142 to the first position.

The urging mechanism is similar to that of the first embodiment shown in FIGS. 1 to 3 and comprises a helical torsion spring, which is however omitted in FIG. 6 for simplicity. Also, the lock mechanism is similar to that of the first embodiment shown in FIGS. 1 to 3 and comprises a catch 48, which is an integral portion of the first hood member 62 and is formed on its distal end edge, and a slide lock member 50, which is supported by the body housing 122 for sliding motion and is engageable at its tip end with the catch 48.

The slide lock member 50, when in engagement with the catch 48, serves to retain the hood mechanism 142 in the first position as shown in FIG. 5. If the user operates the slide lock member 50 to disengage it from the catch 48, the first hood member 62 is kicked upwardly by the helical torsion spring and the second hood member 64 is lifted up by the linkage 60, so as to move the hood mechanism 142 into the second position as shown in FIG. 4.

As with the first embodiment shown in FIGS. 1 to 3, an electric switch 52 is provided on the body housing 122 and the first hood member 62 has a protrusion 54 which is engageable with the electric switch 52 only when the hood mechanism 142 is in the first position. Thus, the electric switch 52 is turned on and off depending on whether the hood mechanism 52 is in the first position.

When the scanning camera 120 is not used, the hood mechanism 142 can be kept folded in the first position (FIG. 5). With the hood mechanism 142 in this position, the first hood member 62 lies in the top surface of the body housing 122 to cover and protect the finder screen 36. At the same time, the second hood member 64 lies in the front surface of the body housing 122 to close the photographing window 30 (and thus close the image pickup light-passage defined thereby), so that the second hood member 64 blocks and prevents environmental light from entering the image pickup optical system 28 as well as protects the cover glass 31 fitted in the photographing window 30.

When the scanning camera 120 is used for taking a photograph, the user may simply operate the slide lock member 50 so as to unlock the hood mechanism 142, which is then moved into the second position by the force of the helical torsion spring, in the manner as described above. With the hood mechanism 142 in this position, the second hood member 64 lies in front of the finder screen 36 and extends upright relative to the top surface of the body housing 122. At the same time, the first hood member 62 lies at one side (right-hand side) of the finder screen 36 and extends again upright relative to the top surface of the body housing 122. Further, under this condition, each of the lower edges of the first and second hood members 62 and 64 lies below the top surface of the body housing 122 (i.e., the first and second hood members 62 and 64 overlap the front and right-hand side surfaces of the body housing 122, respectively) so that there is no such slit between them that allows light rays to pass therethrough to illuminate the finder screen 36. Thus, the hood mechanism 42, when in the second position, i) uncovers the finder screen 36, ii) leaves the photographing window 30 (and thus the image pickup light-passage) open and iii) partially surrounds the finder screen 36 so as to shades the finder screen 36 from environmental light which otherwise could illuminate the screen 36 from the front and the right-hand side of the scanning camera 120. This effectively reduces the dilution of the image on the screen 36 by such environmental light while permits environmental light to enter the image pickup optical system 28 for photographing.

As apparent from the above, in either of the two embodiments thus described, the hood mechanism 42 or 142 may be set, through a simple operation of the slide lock member 50, to extend upright relative to the top surface of the body housing 122 to serve as the hood for the finder screen 36, while it can be fold down to serve as the protection cover for the finder screen 36. The operation for folding down the hood mechanism 42 or 142 is very simple, and thus it is considered that the user would hardly forget to do it after he has taken a picture by using the scanning camera 20 or 120.

With the hood mechanism 42 or 142 being thus folded, environmental light is blocked and prevented from entering the image pickup optical system 28, so that the linear CCD image sensor 24 is protected from the injurious direct sunshine, and the cover glass 31 fitted in the photographing window 30 is protected from any injurious contacts with hard objects.

While each of the disclosed embodiments shows an exemplified application of the present invention to a scanning camera, the application of the present invention is not limited to the scanning cameras. For example, the present invention may be advantageously applied to electronic still cameras having a two-dimensional-array CCD image sensor, as well as to video cameras having any type of CCD image sensor.

Further, while the present invention requires an image display screen provided on an outer surface of a body housing of an image pickup apparatus, the image display screen may or may not comprise a finder screen of an optical finder such as found in each of the disclosed embodiments. For example, the image pickup apparatus may have a monitor device including a liquid crystal display panel, on which an image is displayed based on video signals, and the image display screen may comprise the liquid crystal display panel.

Moreover, while the hood mechanism 42 or 142 of each disclosed embodiment partially surrounds the image display screen comprising the finder screen 36, the hood mechanism may be modified to fully surround the image display screen if desired.

In any event, the hood device of the present invention provides organically combined functions including those of a protection cover for the image display screen, of a hood for shading the image display screen from environmental light and of a cap for closing the image pickup light-passage. By virtue of this, the hood device of the present invention is helpful in preventing an inadvertent failure of putting a protection cap in place, as well as in eliminating the need for bringing along separate accessories including a protection cover for the image display screen, a hood for the image display screen and a protection cap for the photographing optical system.

Having described the present invention with reference to preferred embodiments thereof, it is to be understood that the present invention is not limited to the disclosed embodiments, but may be embodied in various other forms without departing from the spirit and the scope of the present invention as defined by the appended claims.

What is claimed is:

1. A hood device for an image pickup apparatus, said image pickup apparatus comprising: i) a body housing; ii) an image pickup optical system housed in said body housing that captures an image in a field of view; iii) an image display screen provided on an outer surface of said body housing; and iv) said body housing comprising an image pickup light-passage formed therein through which environmental light may enter said image pickup optical system, said hood device comprising:
    a hood mechanism coupled to said body housing and movable between first and second positions;
    said hood mechanism being configured to, when in said first position, cover said image display screen and close said image pickup light-passage;
    said hood mechanism being configured to, when in said second position, uncover said image display screen, leave said image pickup light-passage open and shade said image display screen from environmental light by at least partially surrounding said image display screen;
    said hood mechanism comprises a hood member connected to said body housing to pivot;
    said hood member comprises a first plate portion and a second plate portion;
    said first and second plate portions being configured to cover said image display screen and close said image pickup light-passage, respectively, when said hood mechanism is in said first position;
    said body housing comprises a front wall defining a front surface and a top wall defining a top surface;
    said image pickup light-passage being provided in said front wall of said body housing;
    said image display screen being provided on said top surface of said body housing;
    said first and second plate portions of said hood member are configured to lie in said top and front surfaces, respectively, of said body housing when said hood mechanism is in said first position; and
    said first and second plate portions of said hood member are configured to lie at one side and in front, respectively, of said image display screen and extend upright relative to said top surface of said body housing for shading said image display screen from environmental light when said hood mechanism is in said second position.

2. A hood device for an image pickup apparatus according to claim 1, wherein:
    said image pickup apparatus comprises an optical finder that monitors an image in a field of view, said optical finder comprises a finder screen; and
    said image display screen comprises said finder screen.

3. A hood device for an image pickup apparatus according to claim 1, wherein:
    said image pickup apparatus comprises a monitor device including a liquid crystal display panel; and
    said image display screen comprises said liquid crystal display panel.

4. A hood device for an image pickup apparatus according to claim 1, wherein:
    said image pickup apparatus comprises a video camera comprising a charge-coupled-device image sensor.

5. A hood device for an image pickup apparatus according to claim 1, wherein:
    said image pickup apparatus comprises an electronic still camera comprising a two-dimensional-array charge-coupled-device image sensor.

6. A hood device for an image pickup apparatus according to claim 1, wherein:
    said image pickup apparatus comprises a two-dimensionally-scanning camera comprising a linear charge-coupled-device image sensor and a scanning optical system.

7. A hood device for an image pickup apparatus according to claim 1, wherein:
    said image pickup apparatus comprises an electrical switch relating to a function of said image pickup apparatus; and
    said hood mechanism being configured for turning on and off said electrical switch in accordance with the position of said hood mechanism.

8. A hood device for an image pickup apparatus according to claim 1, wherein:
    said image pickup light-passage further comprises a window provided in said front wall of said body housing with a cover glass being fitted in said window; and
    said hood mechanism protecting said cover glass when it is in said first position.

9. A hood device for an image pickup apparatus according to claim 1, wherein:
    said hood mechanism is further configured to block and prevent environmental light from entering said image pickup optical system when it is in said first position.

10. A hood device for an image pickup apparatus, said image pickup apparatus comprising: i) a body housing; ii) an image pickup optical system housed in said body housing that captures an image in a field of view; iii) an image display screen provided on an outer surface of said body housing; and iv) said body housing comprising an image pickup light-passage formed therein through which environmental light may enter said image pickup optical system, said hood device comprising:
    a hood mechanism coupled to said body housing and movable between first and second positions;
    said hood mechanism being configured to, when in said first position, cover said image display screen and close said image pickup light-passage;
    said hood mechanism being configured to, when in said second position, uncover said image display screen, leave said image pickup light-passage open and shade said image display screen from environmental light by at least partially surrounding said image display screen;
    said hood mechanism comprises a first hood member pivotally connected to said body housing and a second hood member slidably supported by said body housing;
    said first and second hood members are configured to cover said image display screen and close said image pickup light-passage, respectively, when said hood mechanism is in said first position;
    said hood mechanism further comprises a linkage that interlocks pivoting of said first hood member and sliding said second hood member with each other;

said body housing comprises a front wall defining a front surface and a top wall defining a top surface;

said image pickup light-passage being provided in said front wall of said body housing;

said image display screen being provided on said top surface of said body housing;

said first and second hood members are configured to lie in said top and front surfaces, respectively, of said body housing when said hood mechanism is in said first position; and said first and second hood member are configured to lie at one side and in front, respectively, of said image display screen and extend upright relative to said top surface of said body housing for shading said image display screen from environmental light when said hood mechanism is in said second position.

11. A hood device for an image pickup apparatus, said image pickup apparatus comprising: i) a body housing; ii) an image pickup optical system housed in said body housing that captures an image in a field of view; iii) an image display screen provided on an outer surface of said body housing; and iv) said body housing comprising an image pickup light-passage formed therein through which environmental light may enter said image pickup optical system, said hood device comprising:

a hood mechanism coupled to said body housing and movable between first and second positions;

said hood mechanism being configured to, when in said first position, cover said image display screen and close said image pickup light-passage;

said hood mechanism being configured to, when in said second position, uncover said image display screen, leave said image pickup light-passage open and shade said image display screen from environmental light by at least partially surrounding said image display screen; and said hood mechanism comprising sides substantially orthogonal to each other.

12. A hood device for an image pickup apparatus, said image pickup apparatus comprising: i) a body housing; ii) an image pickup optical system housed in said body housing that captures an image in a field of view; iii) an image display screen provided on an outer surface of said body housing; and iv) said body housing comprising an image pickup light-passage formed therein through which environmental light may enter said image pickup optical system, said hood device comprising:

a hood mechanism coupled to said body housing and movable between first and second positions;

said hood mechanism being configured to, when in said first position, cover said image display screen and close said image pickup light-passage;

said hood mechanism being configured to, when in said second position, uncover said image display screen, leave said image pickup light-passage open and shade said image display screen from environmental light by at least partially surrounding said image display screen; and said hood mechanism comprising sides substantially transverse to each other.

13. A hood device for an image pickup apparatus according to claim 9, wherein:

said image pickup apparatus comprises an optical finder that monitors an image in a field of view, said optical finder comprises a finder screen; and said image display screen comprises said finder screen.

14. A hood device for an image pickup apparatus according to claim 12, wherein:

said image pickup apparatus comprises a monitor device including a liquid crystal display panel; and said image display screen comprises said liquid crystal display panel.

15. A hood device for an image pickup apparatus according to claim 12, wherein:

said image pickup apparatus comprises a video camera comprising a charge-coupled-device image sensor.

16. A hood device for an image pickup apparatus according to claim 12, wherein:

said image pickup apparatus comprises an electronic still camera comprising a two-dimensional-array charge-coupled-device image sensor.

17. A hood device for an image pickup apparatus according to claim 12, wherein:

said image pickup apparatus comprises a two-dimensionally-scanning camera comprising a linear charge-coupled-device image sensor and a scanning optical system.

18. A hood device for an image pickup apparatus according to claim 12, wherein:

said image pickup apparatus comprises an electrical switch relating to a function of said image pickup apparatus; and said hood mechanism being configured for turning on and off said electrical switch in accordance with the position of said hood mechanism.

* * * * *